(12) United States Patent
Benson et al.

(10) Patent No.: US 7,422,031 B2
(45) Date of Patent: Sep. 9, 2008

(54) ROTARY UNIONS, FLUID DELIVERY SYSTEMS, AND RELATED METHODS

(75) Inventors: Arne C. Benson, Shakopee, MN (US); Edward D. Hanzlik, Shorewood, MN (US)

(73) Assignee: FSI International, Inc., Chaska, MN (US)

( * ) Notice: Subject to any disclaimer, the term of this patent is extended or adjusted under 35 U.S.C. 154(b) by 466 days.

(21) Appl. No.: 10/799,250

(22) Filed: Mar. 12, 2004

(65) Prior Publication Data
US 2005/0200123 A1      Sep. 15, 2005

(51) Int. Cl.
*F16L 27/08*      (2006.01)
(52) U.S. Cl. .................... 137/580; 285/14; 285/275
(58) Field of Classification Search ........... 137/580; 285/14, 272, 275
See application file for complete search history.

(56) References Cited

U.S. PATENT DOCUMENTS

| | | | | |
|---|---|---|---|---|
| 1,797,833 A | * | 3/1931 | McQueer | 508/109 |
| 3,462,174 A | * | 8/1969 | Raley | 285/14 |
| 3,542,443 A | * | 11/1970 | Eklund | 384/463 |
| 3,570,536 A | | 3/1971 | Walker et al. | |
| 3,586,051 A | | 6/1971 | Walker et al. | |
| 3,658,092 A | | 4/1972 | Walker et al. | |
| 4,183,545 A | | 1/1980 | Daly | |
| 4,192,559 A | | 3/1980 | Hewitt | |
| 4,313,624 A | | 2/1982 | Zierden et al. | |
| 4,455,121 A | * | 6/1984 | Jen | 415/143 |
| 4,557,506 A | | 12/1985 | Hanks et al. | |
| 4,561,681 A | | 12/1985 | Lebsock | |
| 4,726,397 A | * | 2/1988 | Stich | 137/580 |
| 4,848,400 A | | 7/1989 | Grant et al. | |
| 4,892,286 A | * | 1/1990 | Reinicke et al. | 251/129.11 |
| 4,976,282 A | * | 12/1990 | Kubala | 137/580 |
| 5,017,820 A | | 5/1991 | Culp | |
| 5,058,927 A | * | 10/1991 | Miwa | 285/14 |
| 5,146,786 A | | 9/1992 | Nachbar | |
| 5,169,408 A | | 12/1992 | Biggerstaff et al. | |
| 5,203,592 A | | 4/1993 | Takada | |
| 5,443,416 A | | 8/1995 | Volodarsky et al. | |
| 5,500,976 A | | 3/1996 | Rohrbacher et al. | |
| 5,538,292 A | | 7/1996 | Sommer | |
| 5,570,908 A | | 11/1996 | Merritt | |
| 5,676,402 A | | 10/1997 | Eley et al. | |

(Continued)

FOREIGN PATENT DOCUMENTS

DE      4019987      1/1991

(Continued)

*Primary Examiner*—John Rivell
(74) *Attorney, Agent, or Firm*—Kagan Binder, PLLC

(57) ABSTRACT

A rotary union having a housing, a rotor, and a post such that a fluid can be conveyed through the rotary union. The rotor is rotatably coupled to the housing, preferably by at least one bearing interposed between a portion of the rotor exterior and a portion of the housing interior. The post is positioned in the rotary union in a manner effective to help fluidly couple the rotor to the housing and such that an annular gap surrounds at least a portion of the post such that the annular gap constitutes at least a portion of a drain fluid pathway. The present invention also includes fluid delivery systems including such rotary unions and methods of making and/or using such rotary unions.

20 Claims, 8 Drawing Sheets

U.S. PATENT DOCUMENTS

| | | | |
|---|---|---|---|
| 5,707,186 A | 1/1998 | Gobell et al. | |
| 5,713,609 A | 2/1998 | Mascola | |
| 5,799,692 A * | 9/1998 | Gobell et al. | 137/580 |
| 5,833,147 A | 11/1998 | Fuhlbrigge | |
| 5,901,643 A | 5/1999 | Bornhorst | |
| 5,947,337 A | 9/1999 | Worth | |
| 6,029,695 A | 2/2000 | Logan | |
| 6,095,159 A * | 8/2000 | Blalock et al. | 134/1.1 |
| 6,105,645 A | 8/2000 | Ingram | |
| 6,109,659 A | 8/2000 | Heidenreich et al. | |
| 6,302,967 B1 | 10/2001 | Rohrbacher et al. | |
| 6,305,437 B1 | 10/2001 | Edwards et al. | |
| 6,343,793 B1 | 2/2002 | Patton et al. | |
| 6,402,602 B1 | 6/2002 | Garcia et al. | |
| 6,503,075 B1 | 1/2003 | Schad et al. | |
| 6,585,019 B1 | 7/2003 | Ingram | |
| 2002/0051596 A1 * | 5/2002 | Yamamoto et al. | 384/527 |
| 2002/0163185 A1 | 11/2002 | Bornhorst | |
| 2002/0196991 A1 * | 12/2002 | Giesler et al. | 384/565 |

FOREIGN PATENT DOCUMENTS

| | | |
|---|---|---|
| JP | 11101250 | 4/1999 |

* cited by examiner

ROTARY UNIONS, FLUID DELIVERY SYSTEMS, AND RELATED METHODS

FIELD OF THE INVENTION

The field of this invention relates to fluid delivery systems, and more particularly, this invention relates to rotary unions, such as may be used to facilitate the transfer of a fluid, typically a liquid, from a first environment, e.g., a fluid source, to a second environment, e.g., a rotating point of use, that rotates relative to the first environment.

BACKGROUND OF THE INVENTION

In general, rotary unions and fluid delivery systems are well known, especially in the semiconductor processing industry. In the semiconductor processing industry, a rotary union is commonly used to facilitate the transfer of process liquid(s) from a first environment to a second environment that rotates relative to the first environment. Most commonly, one or more liquid(s) from a generally stationary supply line are being transferred to a rotating point of use. Exemplary semiconductor process tools that use one or more rotary union(s) include spray process tool systems commercially available from FSI International, Inc. and sold under the trade designations ZETA® and MERCURY®.

Rotary unions may include at least two components that rotate relative to one another. At least one component is fluidly coupled to a first environment and the at least other component is fluidly coupled to a second environment. Fluid (s), typically liquid(s), can be transferred from one environment to the other. One embodiment of a conventional rotary union is disclosed in U.S. Pat. No. 4,848,400 (Grant et al.). Another embodiment of a conventional rotary union is disclosed in U.S. Pat. No. 5,570,908 (Merritt).

Conventional components that rotate relative to one another typically have tolerances among them, and maintaining such tolerances is important. For example, if a tolerance between components widens to a point beyond that intended, leaks can occur and/or components can become too loose and/or become damaged. As another example, if a tolerance between components narrows to a point beyond that intended, the components can rub and wear and/or even prevent rotation of the rotating component(s). Thus, for a rotary union to work well, one or more appropriate tolerances among parts is established when the rotary union is manufactured and then reasonably maintained during use.

One drawback of some rotary unions is that their operation is limited to relatively narrow temperature ranges. For example, the fit among parts in a rotary union can either widen and/or narrow too much as the temperature changes (e.g., as the temperature becomes too hot and/or too cold). However, since many industrial processes that use rotary unions operate in a relatively broad temperature range, it may be desirable to use a rotary union that can perform well in such a relatively more broad temperature range. For example, many processes in the semiconductor industry treat semiconductor wafers with various process liquids that are at much different temperatures (hot and cold).

Another drawback of some rotary unions is that debris may be generated in some applications (e.g., in the manufacture of microelectronics and/or medical devices) during even normal operations of the rotary union. Such debris can be generated from several sources. It can be generated from certain components intentionally and/or unintentionally rubbing against one another. Debris can also be generated from certain components such as lubricated/greased bearings. Such debris can be undesirable because it can contaminate process fluids, which in turn can contaminate manufactured goods that have stringent product specifications (e.g., microelectronic devices and medical devices). Such debris can also be undesirable because it can cause undue wear to rotary union components and/or downstream components. For debris-sensitive applications and/or downstream components, debris generation is more unsatisfactory when debris enters a primary fluid pathway, but is less objectionable if it enters only one or more drain pathways and/or is outside the primary fluid and/or drain fluid pathway(s). Moreover, the tendency of debris to enter a primary fluid pathway can be significantly influenced by the positioning of debris-generating component(s) relative to the primary fluid and pathway.

There is a continuing need to develop rotary unions and fluid delivery systems that are new, including rotary unions that are more robust to changes in temperature and/or that present less of a risk for unsatisfactory debris generation and/or that present less of risk that any generated debris will enter a primary fluid pathway.

SUMMARY OF THE INVENTION

The present invention provides improved rotary unions and fluid delivery systems that can transfer a fluid (e.g., a process liquid) among locations that rotate relative to one another. A rotary union of the present invention can exhibit numerous advantages. For example, a rotary union according to the present invention can operate over a wide range of temperatures with excellent performance. Also, a rotary union according to the present invention can exhibit a reduced level of debris generation and/or reduced level of component wear, as compared to many other rotary unions. A rotary union of the present invention can also exhibit improved rotational stability (i.e., exhibits a reduced tendency for the rotary union to precess) and/or less resistance to rotation, as parts rotate relative to one another.

Rotary unions and fluid delivery systems according to the present invention can be particularly useful in microelectronic device applications, telecommunication device applications, and/or medical device applications where use of ultra clean reagents is common and flexibility to operate over a relatively wide range of temperatures is desirable.

Parts of a rotary union according to the present invention are assembled so that surfaces defining primary fluid pathways and drain pathways can rotate relative to each other without rotatably and/or slideably engaging each other in any significant way, if at all. Any surfaces that slideably and/or rotatably engage each other preferably are outside these fluid pathways. In preferred embodiments, rotatably and/or slideably engaging surfaces are confined to bearing(s) external to fluid pathway(s), and these bearing(s) also help to maintain the tolerances and/or spacing among components. In preferred embodiments, maintaining such tolerances and/or spacing among components is facilitated by one or more of properly locating one or more bearings, e.g., between the rotor and housing, and properly selecting component(s) materials, e.g., matching, or otherwise coordinating, the dimensional stability of materials among parts. Maintaining such tolerances can be highly desirable because a fluid flowing through the gap can be precisely controlled (e.g., minimized).

According to one aspect of the present invention, a rotary union includes a housing having a fluid path through which a fluid can be conveyed through the housing, a rotor having a fluid path through which a fluid can be conveyed through the rotor, and a post having a fluid path through which a fluid can be conveyed through the post. The rotor is rotatably coupled to the housing and the post is positioned in the rotary union in a manner effective to help fluidly couple the rotor fluid path and the housing fluid path such that a fluid can be transferred between the housing and the rotor via the post fluid path. The rotary union also includes an annular gap surrounding at least a portion of the post such that the annular gap constitutes at least a portion of a drain pathway through which a portion of fluid conveyed through the housing fluid path is drained from the rotary union.

In one embodiment according to the present invention, the rotary union includes a housing having a base portion, a rotor, a post, a first fluid port, a second fluid port, a fluid pathway, and a drain pathway. The rotor has a first end positioned at least partially in the housing interior and is rotatably coupled to the housing. The post extends from the base portion of the housing at least partially into a chamber in the rotor, the chamber being oversized relative to the post such that an annular gap extends along a length of the post between the post and the rotor. The first fluid port is associated with the housing through which a fluid can exit or enter the rotary union, and the second fluid port is associated with the rotor through which a fluid can exit or enter the rotary union. The fluid pathway extends through the rotary union at least between the first and second fluid ports and includes first and second pathway portions. The first pathway portion extends through the post and the second pathway portion extends through the rotor such that the first pathway portion is in fluid communication with the second pathway portion via a juncture inside the rotor chamber. The drain pathway having an inlet inside the rotor chamber proximal to said juncture, wherein the annular gap between the post and the rotor constitutes at least a portion of the drain pathway.

In another embodiment according to the present invention, the rotary union includes a housing, a rotor, a post, a first fluid port, a second fluid port, a fluid pathway, and a drain pathway. The rotor has a first end positioned at least partially in the housing interior and is rotatably coupled to the housing. The post extends from the first end of the rotor at least partially into a chamber in the housing, the chamber being oversized relative to the post such that an annular gap extends along a length of the post between the post and the housing. The first fluid port is associated with the housing through which a fluid can exit or enter the rotary union, and the second fluid port is associated with the rotor through which a fluid can exit or enter the rotary union. The fluid pathway extends through the rotary union at least between the first and second fluid ports and includes first and second pathway portions. The first pathway portion extends through the housing and the second pathway portion extends through the post such that the first pathway portion is in fluid communication with the second pathway portion via a juncture inside the housing chamber. The drain pathway having an inlet inside the housing chamber proximal to said juncture, wherein the annular gap between the post and the housing constitutes at least a portion of the drain pathway.

In preferred embodiments, the rotor is rotatably coupled to the housing by having at least one bearing interposed between a portion of the rotor exterior and a portion of the housing interior. Preferably, the bearing(s) has ball bearings made with material that includes ceramic material (e.g., silicon nitride), and inner and outer races made with material that includes hardened stainless steel (e.g., 440C stainless steel). Also, in preferred embodiments the bearing(s) is un-lubricated.

According to another aspect of the present invention, a method of making a rotary union includes providing a housing, a rotor, a post, and at least one bearing, positioning the post in the rotary union, and rotatably coupling the rotor to the housing. The housing has a fluid path through which a fluid can be conveyed through the housing, the rotor has a fluid path through which a fluid can be conveyed through the rotor, and the post has a fluid path through which a fluid can be conveyed through the post. The post is positioned in the rotary union in a manner effective to help fluidly couple the rotor fluid path and the housing fluid path such that a fluid can be transferred between the housing and the rotor via the post fluid path. The rotor is rotatably coupled to the housing such that an annular gap surrounds at least a portion of the post such that the annular gap constitutes at least a portion of a drain pathway through which a portion of fluid conveyed through the housing fluid path is drained from the rotary union.

Preferably, rotatably coupling the rotor to the housing includes interposing at least one bearing between a portion of the rotor exterior and a portion of the housing interior.

BRIEF DESCRIPTION OF THE DRAWINGS

The understanding of the above mentioned and other advantages of the present invention, and the manner of attaining them, and the invention itself can be facilitated by reference to the following description of the exemplary embodiments of the invention taken in conjunction with the accompanying drawings, wherein.

DETAILED DESCRIPTION

Figure 1:
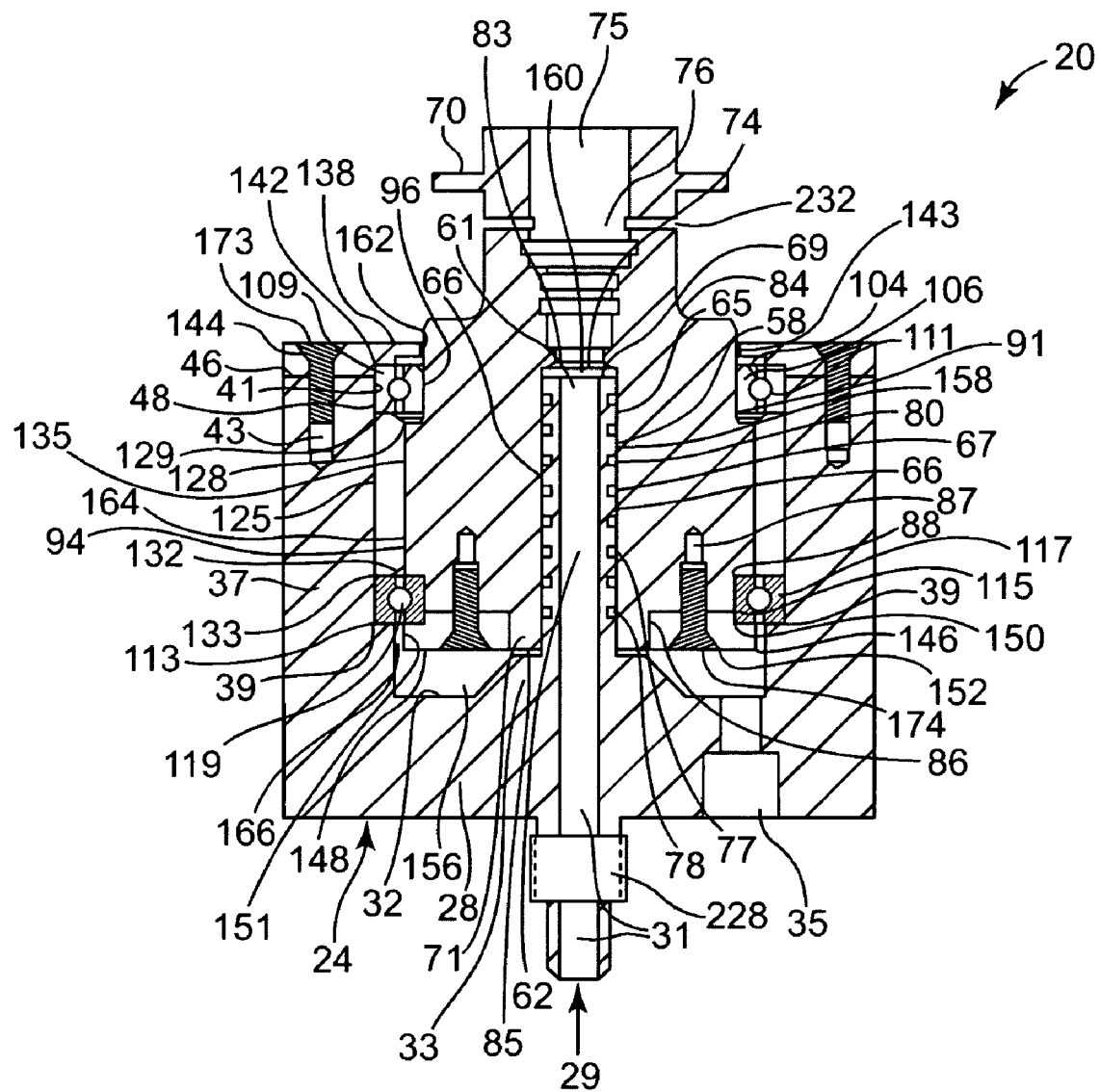
FIG. 1 illustrates a side, cross-sectional view of a rotary union according to the present invention.
Figure 2:
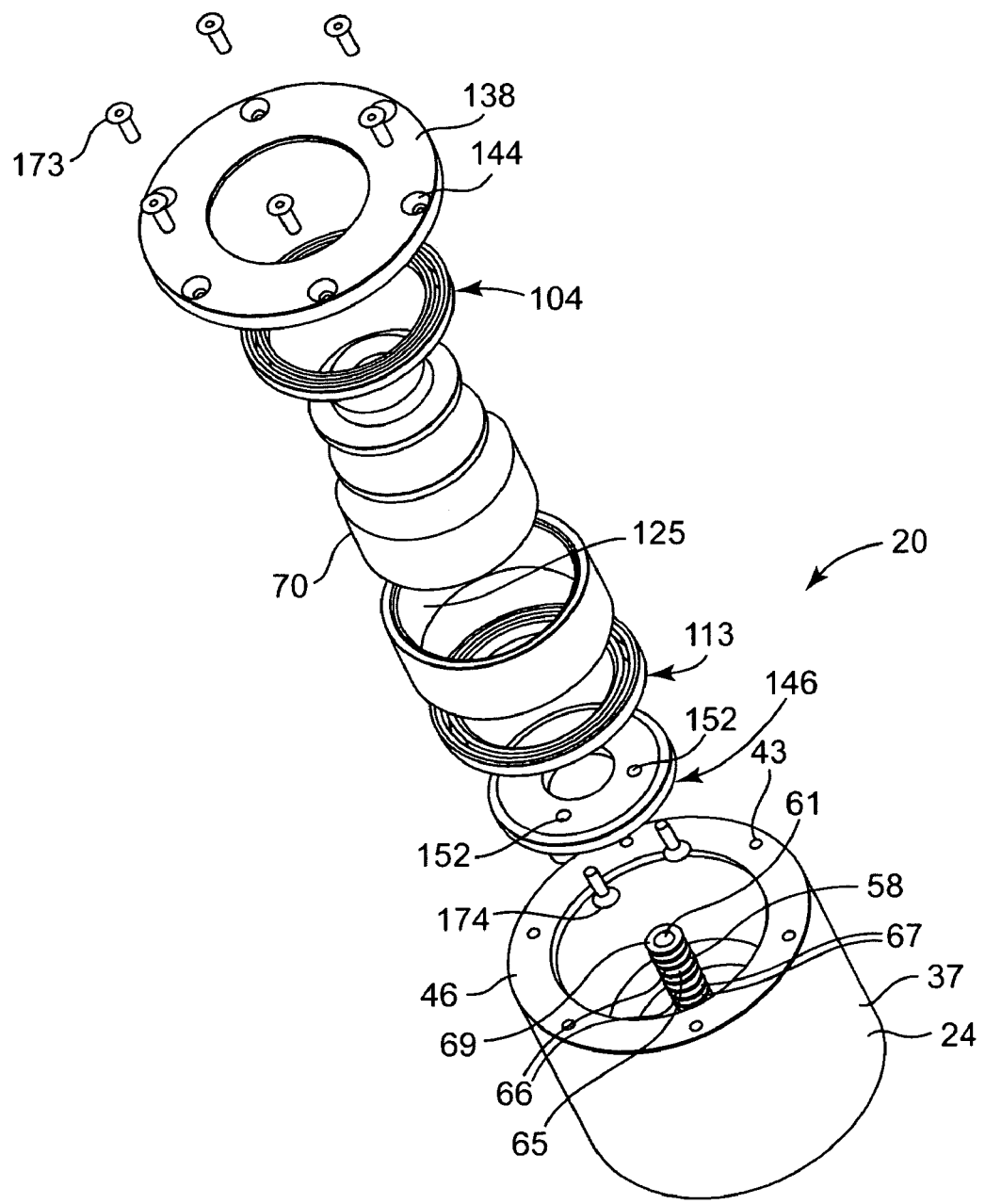
FIG. 2 illustrates an exploded, perspective view of the rotary union of FIG. 1, showing several internal components.
Figure 3:
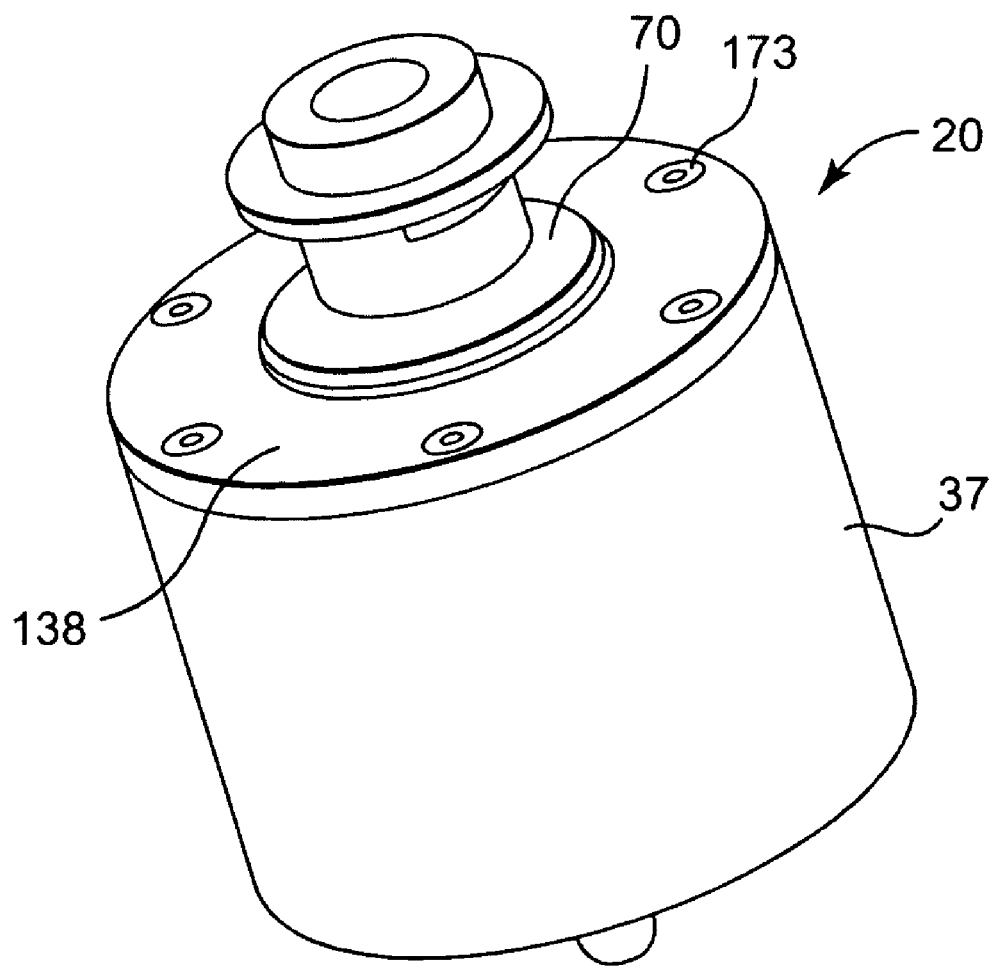
FIG. 3 illustrates a first perspective view of the rotary union of FIG. 1.
Figure 4:
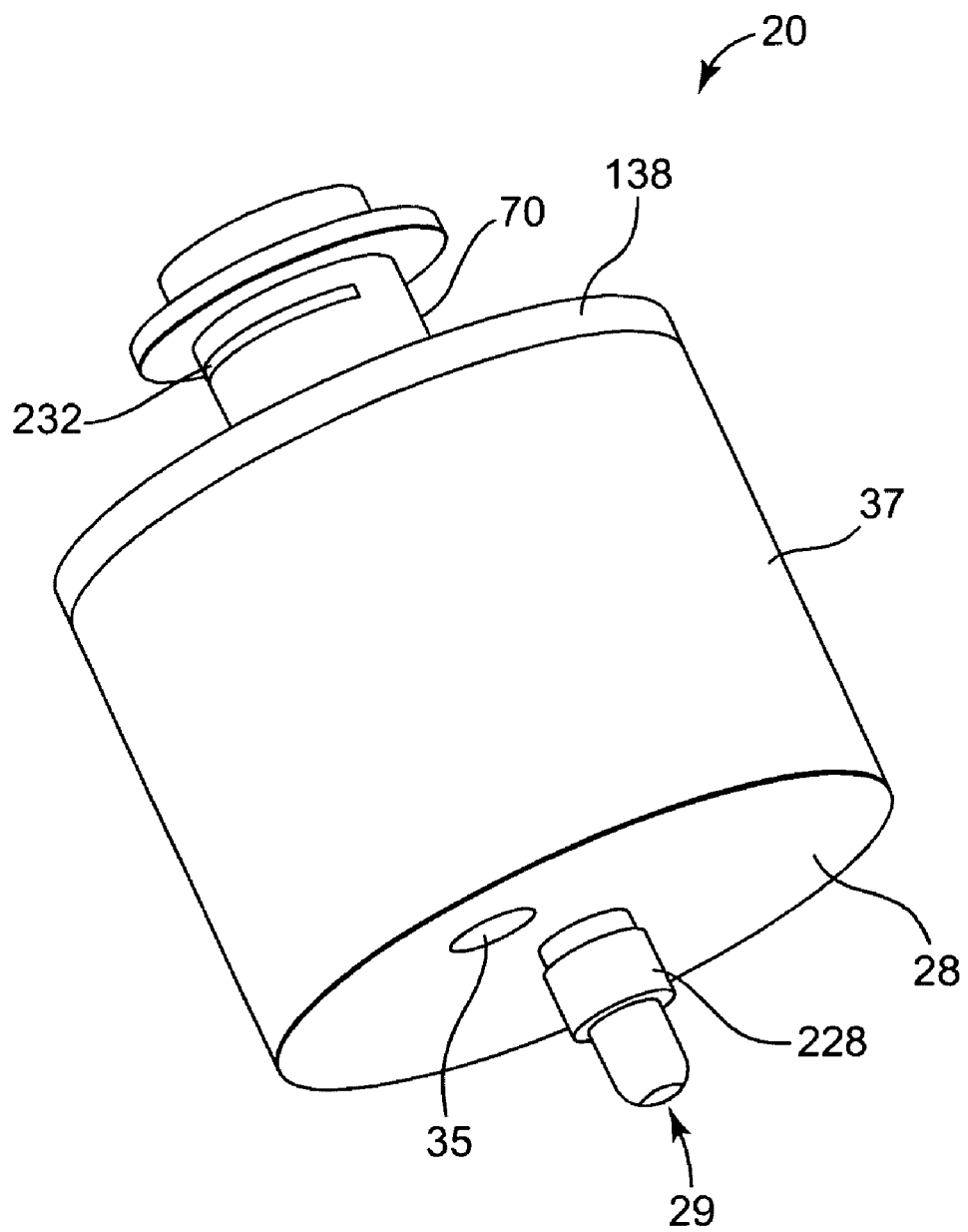
FIG. 4 illustrates a second perspective view of the rotary union of FIG. 1.
Figure 5:
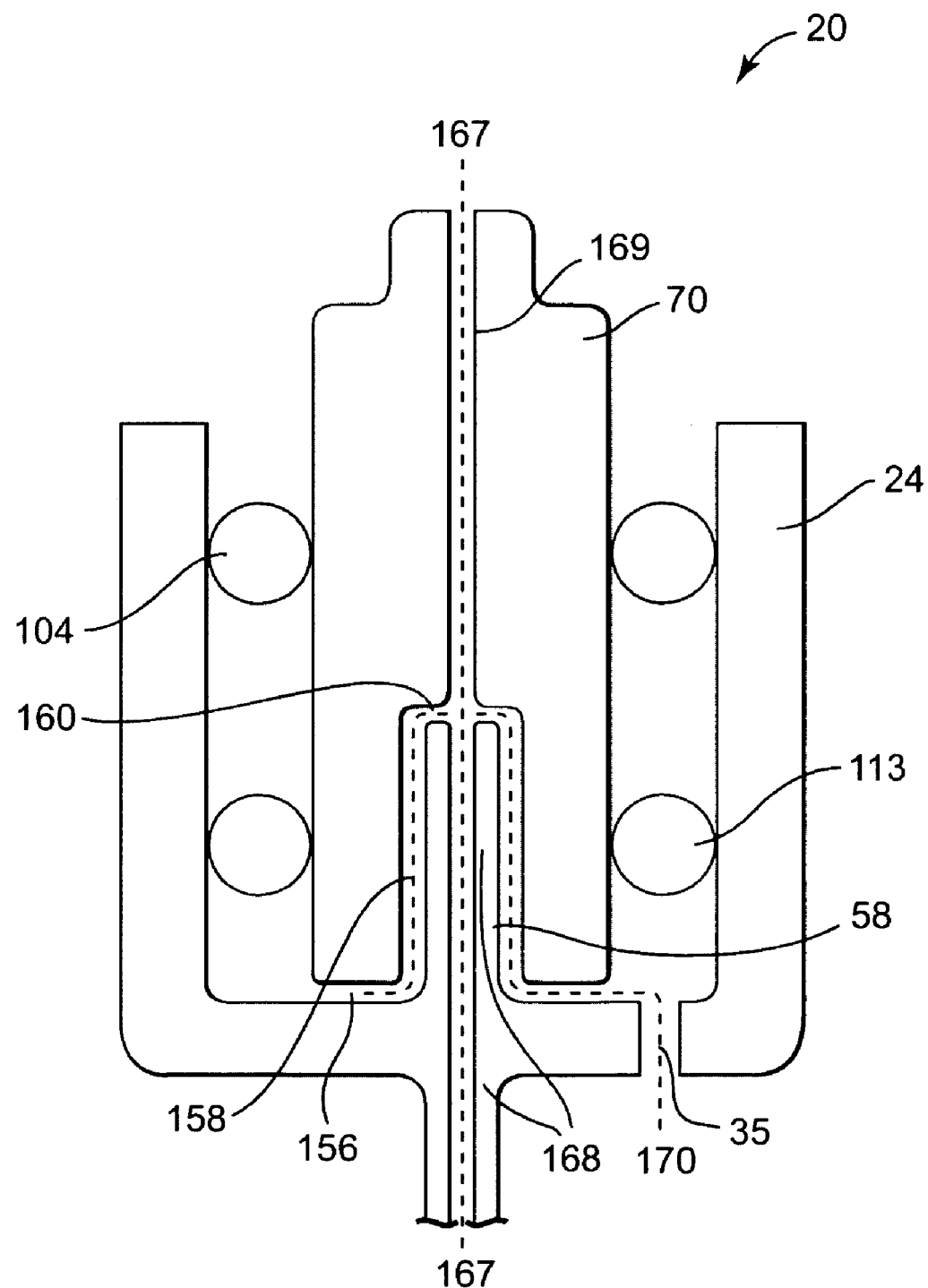
FIG. 5 illustrates a schematic, cross-sectional view of the rotary union of FIG. 1, better showing (not to scale) the spacing between the rotor and post, and the spacing between the rotor and housing.

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

An exemplary rotary union according to the present invention is described below with reference to FIGS. 1-5. As shown, rotary union 20 includes a cylindrical housing 24, a cylindrical post 58, and a cylindrical rotor 70, which facilitate the transfer of process fluid(s) among locations that rotate relative to one another.

Housing 24 has a fluid path 31 (e.g., a through-bore) through which a fluid can be conveyed through housing 24. Preferably, housing 24 has a bottom (or base portion) 28. As shown, fluid path 31 extends through bottom 28. Fluid path 31 defines part of a fluid pathway 167 (discussed below). As shown, fluid path 31 is a linear through-bore, but could be curved in shape, bifurcate into one or more pathway(s), etc. Linear through-bore fluid path 31 is preferred because, for example, it provides less resistance to fluid flow. As shown, bottom 28 has a first, or interior, surface 32. Preferably, first surface 32 has a raised portion 33 that can help provide reinforcement and guide drain fluid to drain 35, which is positioned through bottom 28 and is typically connected to additional drain plumbing (not shown). Preferably, housing 24 also has an associated fluid port 29 through which a fluid can exit or enter rotary union 20. Fluid port 29 can be connected to additional plumbing (described below).

Housing 24 also has a sidewall 37. As shown, cylindrical sidewall 37 extends from bottom 28 and helps to define a housing interior 48. On the inside of sidewall 37, proximal to bottom 28, is a shoulder 39. Farther from bottom 28, on the inside of sidewall 37, is an upper region 41 of sidewall 37. On the end portion of sidewall 37 is a surface 46, which provides access to one or more threaded bore(s) 43 for securing additional componentry to the housing (discussed below).

Rotary union 20 also includes a fluid conducting member in the exemplary form of post 58. Post 58 is used to facilitate the transfer of fluids through rotary union 20, and more particularly, to facilitate the exchange of fluid between components in rotary union 20 that move relative to one another.

Post 58 has a fluid path 62 (e.g., through-bore) through which a fluid can be conveyed through post 58 and is positioned in rotary union 20 in a manner effective to help fluidly couple rotor fluid path 76 and housing fluid path 31 such that a fluid can be transferred between housing 24 and rotor 70 via post fluid path 62. Post fluid path 62 defines part of a fluid pathway 167 (discussed below). As shown, fluid path 62 is a linear through-bore, but could be curved in shape, bifurcate into one or more pathway(s), etc. Linear through-bore fluid path 62 is preferred because, for example, it provides less resistance to fluid flow. Post 58 also has an associated fluid port 61 that helps to fluidly couple rotor fluid path 76 and housing fluid path 31. Post 58 is also fluidly coupled to rotor 70 by positioning fluid port 61 is positioned proximal to rotor fluid port 74 inside rotor 70. Such an arrangement facilitates the exchange of fluid between the housing 24/post 58 and rotor 70.

Preferably, as shown, post 58 extends from housing bottom (or base portion) 28 at least partially into chamber 77 in rotor 70, the chamber 77 being oversized relative to post 58 such that an annular gap 158 extends along the length of post 58 between post 58 and rotor 70. As shown, post 58 can extend into chamber 77 through opening 78. Rotor interior wall 80 and "necked in" portion 83 help to define chamber 77. Annular gap 158 surrounds at least a portion of post 58 such that annular gap 158 constitutes at least a portion of a drain pathway (discussed below) through which a portion of fluid conveyed through housing fluid path 31 is drained from rotary union 20. As shown, annular gap 158 is between rotor interior wall 80 and post exterior side region 66. According to the present invention, first bearing 104 and second bearing 113 can help reliably maintain annular gap 158 within extremely close tolerances. This is highly desirable because maintaining the annular gap 158 within close tolerances allows any drain fluid flowing through gap 158 (discussed below) to be precisely controlled. Preferably, the drain fluid flow rate is minimized so that the process fluid delivered to a process is maximized. Maintaining the annular gap 158 also virtually prevents rotor 70 and post 58 from slideably and/or rotatably engaging during relative rotation of rotor 70 around post 58 which can reduce debris generation, preferably prevent debris generation, that may otherwise occur if rotor 70 and post 58 were allowed to slideably and/or rotatably engage. Reducing and/or preventing generation of debris between the post and rotor is highly desirable since the main fluid pathway passes across gap 160 (discussed further below).

Positioning post 58 in rotor chamber 77 also results in axial gap 160. Axial gap 160 is between the top surface 69 of post 58 and the "necked in" portion 83 of rotor chamber 77.

Post 58 also includes post exterior 65. Post exterior 65 includes a side region 66 and a top surface 69. Preferably, post side region 66 includes one or more surface discontinuity (ies), for example, grooves 67, that provide controllable resistance to fluid flow between post 58 and rotor 70 in a manner described below. Alternatively, such one or more surface continuities could be located on the inside wall 80 of rotor 70 or on both post side region 66 and inside wall 80 of rotor 70. Also, alternative surface continuity(ies) besides grooves 67 could be used.

As mentioned, post 58 extends from housing 24. Post 58 may be a separate component from housing 24 or it may form a unitary structure with housing 24. As shown, post 58 forms a unitary structure with housing 24. Such a unitary structure can be made by, e.g., casting or molding a single structure. Preferably, as shown, housing fluid path 31 is fluidly coupled in straight-line fluid communication with post fluid path 62. Other lines of communication could be used (e.g., curvilinear), but straight-line is preferred because, for example, it provides less resistance to fluid flow.

Rotary union 20 also includes rotor 70. Rotor 70 has a fluid path 76 (e.g., through-bore) through which a fluid can be conveyed through rotor 70 and rotor 70 is rotatably coupled to housing 24. Fluid path 76 defines part of a fluid pathway 167 (discussed below). As shown, fluid path 31 is a linear through-bore, but could be curved in shape, bifurcate into one or more pathway(s), etc. Linear through-bore fluid path 76 is preferred because, for example, it provides less resistance to fluid flow. Preferably, rotor 70 has a first end 71 positioned at least partially in the housing interior 48. Such positioning of first end 71 helps post 58 fluidly couple rotor fluid path 76 and housing fluid path 31 such that a fluid can be transferred between housing 24 and rotor 70 via post fluid path 62. Preferably, rotor 70 also has an associated fluid port 75 through which a fluid can exit or enter rotary union 20. Fluid port 75 can be connected to additional plumbing (described below).

As mentioned, rotor 70 is rotatably coupled to housing 24. Preferably, rotor 70 is rotatably coupled to housing 24 such that first end 71 of rotor 70 can be positioned at least partially in the housing interior 48, and, as discussed above, such that rotor 70 fits over and is spaced apart from post 58. Depending on the nature of rotor 70 and housing 24, either one or both of rotor 70 and housing 24 can rotate as rotor 70 rotates relative to housing 24. Preferably, rotor 70 rotates while the housing 24 remains stationary during operation.

Preferably, rotor 70 is rotatably coupled to housing 24 by at least one bearing interposed between a portion of the rotor exterior and a portion of the housing interior. Even more preferred, rotor 70 is rotatably coupled to housing 24 by at least two bearings interposed between a portion of the rotor exterior and a portion of the housing interior. If more than one bearing is interposed between a portion of the rotor exterior and a portion of the housing interior, the bearings are preferably spaced apart a distance that helps to rotatably stabilize rotor 70.

As shown in rotary union 20, rotor 70 preferably is rotatably coupled to housing 24 by using first bearing 104 and second bearing 113 that are interposed between a portion of rotor exterior 84 and a portion of housing interior 48. Preferably, first bearing 104 and second bearing 113 are spaced apart from each other by spacer element 125.

Inner race 106 of bearing 104 and inner race 115 of bearing 113 are fixedly coupled to rotor 70, but not housing 24, and outer race 109 of bearing 104 and outer race 117 of bearing 113 are fixedly coupled to housing 24, but not rotor 70. Inner races 106 and 115 can thus rotate with rotor 70 and outer races 109 and 117 can thus rotate with housing 24. Because of this arrangement of the races of bearings 104 and 113, housing 24 and rotor 70 are in contact only via bearings 104 and 113, which allows the rotor 70 and housing 24 to rotate relative to each other, yet keeps the sliding surfaces in the bearings 104 and 113, not between housing 24 and rotor 70. This preferred embodiment shown can help reliably maintain annular spacing between certain components (e.g., the annular spacing between rotor 70 and post 58) and/or can help reduce generation of debris and/or can help keep surfaces that slideably and/or rotatably engage each other outside of fluid pathways (discussed below).

In more detail, first, or top (as shown), bearing 104 facilitates the rotatable coupling of rotor 70 to housing 24 by being interposed between the third, or upper, recess 91 of rotor exterior 84 and upper sidewall region 41 in housing interior 48. As shown, bearing 104 includes inner race 106, outer race 109, and ball bearings 111.

Part of the inner race 106 of first bearing 104 is positioned in third rotor recess 91 and fixedly contacts rotor 70.

Part of outer race 109 of first bearing 104 is positioned in the recess formed by upper sidewall region and the first, or top, flat portion 129 of spacer element 125. The first, beveled portion 128 of spacer element 125 does not contact outer race 109. The other part of outer race 109 is positioned in first recess 142 of first clamping element 138. First bearing 104 fixedly contacts housing 24 by being fastened between first clamping element 138 and the flat portion 129 of spacer element 125 by fastening first clamping element 138 to the upper surface 46 of housing 24 with one or more fastener(s) 173. One or more hole(s) 144 in clamp 138 and one or more threaded-hole(s) 43 in housing 24 can receive such fastener(s) for secure fastening.

Second, or bottom (as shown), bearing 113 also facilitates the rotatable coupling of rotor 70 to housing 24 by being interposed between the second, or bottom, recess 88 of rotor exterior 84 and shoulder 39 of side-wall 37 in housing interior 48. As shown, bearing 113 includes inner race 115, outer race 117, and ball bearings 119.

Part of the inner race 115 of second bearing 113 is positioned in second rotor recess 88 and the other part of inner race 115 of second bearing 113 is positioned in first recess 150 of second clamping element 146. Inner race 115 fixedly contacts rotor 70 by positioning second clamping element 146 in first rotor recess 86, over inner race 115, and fastening clamp 146 to rotor 70 by inserting one or more fastener(s) 174 through one or more hole(s) 152 in clamp 146 and threading said fastener(s) into one or more threaded hole(s) 87.

The bottom, horizontal part of outer race 117 of second bearing 113 is positioned on shoulder 39 of housing sidewall 37. The side, vertical part of outer race 117 contacts the housing sidewall 37. The upper, horizontal part of outer race 117 contacts the second, or bottom, flat portion 133 of spacer element 125. Outer race 117 fixedly contacts housing 24 by fastening first clamping element 138 to the upper surface 46 of housing 24 with one or more fastener(s) 173. The second, beveled portion 132 of spacer element 125 does not contact outer race 117.

A preferred bearing is made with relatively hard material so that it is relatively resistant to wear as compared to less hard materials. A preferred bearing is also un-lubricated (i.e., greaseless) to reduce the potential of lubrication transferring from the bearing to a fluid passing through the rotary union (e.g., a process fluid ultimately delivered to a manufacturing process). A preferred, un-lubricated bearing made with relatively hard material that exhibits exceptional resistance to wear has ball bearings made with material that includes ceramic material (e.g., silicon nitride) and inner and outer races made with material that includes hardened stainless steel (e.g., 440C stainless steel). Such a bearing is commercially available from the KAYDON™ Corporation. According to the present invention, such a preferred bearing can enhance the ability of the first bearing 104 and second bearing 113 to help reliably maintain annular spacing between certain components (e.g., the annular spacing between rotor 70 and post 58 (further discussed below)) and/or to help reduce generation of debris.

As shown, rotatably coupling the rotor 70 to the housing 24 preferably results in gaps between the exterior of rotor 70 and rotor components (if any), and housing 24 and housing components (if any) because bearings 104 and 113 do not contact the entire exterior region of the rotor (and rotor components, if any) that is opposite such housing (and housing components, if any). As shown, rotatably coupling the rotor 70 to the housing 24 results in one axial gap 156 and three annular gaps (gaps 162, 164, and 166) between rotor exterior 84 and housing 24. The axial gap 156 is between 1) the first surface 32 of the bottom 28 of housing 24 and 2) end portion 85 of rotor exterior 84 and second major surface 148 of second clamping element 146. Annular gap 166 is between 1) the lower part of sidewall 37 and 2) side-wall 151 on outer part of second clamping element 146. Annular gap 164 is between 1) vertical wall 94 of rotor exterior 84 and 2) first, inner, wall 135 of spacer element 125. And annular gap 162 is between 1) vertical wall portion 96 of rotor exterior 84 and 2) side-wall 143 of clamp 138. First bearing 104 and second bearing 113 can help maintain annular gaps 162, 164, and 166. Such gaps can prevent rotor 70 and housing 24 from contacting each other, which can result in reduced debris generation.

The components of a rotary union 20 according to the present invention can be made from material or a combination of materials known to those in the semiconductor processing industry. Considerations in choosing the material(s) of construction can include the physical environment (e.g., temperature, pressure, and interaction with related components) and chemical environment (e.g., properties of contacting fluids) the housing is exposed to.

A consideration of particular importance in the present invention is to maintain certain spacing (or gap(s)) between certain components. In one embodiment, the housing 24, post 58, and rotor 70 are made of material comprising dimensionally stable material that can help maintain the annular gap 158 between the rotor interior wall 80 and the post exterior side region 66, especially within extremely close tolerances. Preferably, housing 24, post 58, and rotor 70 are made out of the same dimensionally stable material. Material(s) of construction that is dimensionally stable for housing 24, post 58, and rotor 70 include material(s) that as they heat up or cool down, housing 24, post 58, and rotor 70 expand or contract, respectively, such that gap 158 is maintained within tolerances. Preferably, dimensionally stable material for use in the housing 24, post 58, and rotor 70 is dimensionally stable over a relatively wide temperature range, such as from about 0° C. to about 100° C. Useful materials that are dimensionally stable over a relatively wide temperature range are typically strong, durable, and less susceptible to warping. Preferably, such materials are also dimensionally stable over a relatively long period of time. Preferably, such materials are also compatible with a wide range of process fluids, such as ultra pure water.

A preferred material that exhibits exceptional dimensional stability over a relatively wide temperature range for housing 24, post 58, and rotor 70 is commercially available from Modem Plastics (Bridgeport, Conn.) under the trade designation ULTEM® 1000.

As rotary union 20 is used to facilitate the transfer of process fluid(s) among locations that rotate relative to one another the fluid can follow, as shown, fluid pathway 167. Preferably, fluid pathway 167 extends through rotary union 20 at least between a first fluid port (e.g., housing fluid port 29) and a second fluid port (e.g., rotor fluid port 75). Fluid pathway 167 preferably includes first pathway portion 168 and second pathway portion 169 such that first pathway portion 168 extends through post 58 and second pathway portion extends through rotor 70, and such that first pathway portion 168 is in fluid communication with second pathway portion 169 via a juncture (e.g., across axial gap 160) inside rotor chamber 77. In more detail, as shown, fluid pathway 167 begins at housing fluid port 29, follows housing fluid path 31 and post fluid path 62, and then exits out of post fluid port 61. Depending on the nature of post 58 and/or rotor chamber 77 and/or how the two are positioned with respect to each other, fluid exiting post fluid port can follow a fluid path such as, e.g., fluid pathway 167 or drain pathway 170 (further discussed below). Following fluid pathway 167, fluid port 61 helps fluidly couple housing fluid path 31 to rotor fluid path 76. Rotor fluid port 75 is associated with rotor fluid path 76 and allows fluid to exit or enter rotary union 20. Fluid port 75 can be connected to additional plumbing (described below). As shown, fluid pathway 167 follows a straight-line path through rotary union 20. Alternatively, rotary union 20 could have more than one fluid pathway and/or could follow paths of other shapes (e.g., curved paths). A straight-line path is preferred because, for example, it provides less resistance to fluid flow.

Because, as shown, rotor 70 fits over and is spaced apart from post 58 by gaps 158 and 160, and the fluid pathway 167 crosses gap 160, there is a tendency for a certain amount of process fluid(s) to leak out into annular gap 158, between post 58 and rotor 70, which is the beginning of drain pathway 170. Preferably, drain pathway 170 has an inlet inside rotor chamber 77 proximal to the juncture (e.g., axial gap 160) where first pathway portion 168 is in fluid communication with second pathway portion 169, such that annular gap 158 constitutes at least a portion of drain pathway 170. As mentioned above, according to the present invention, annular gap 158 can be maintained within extremely close tolerances. This is highly desirable because maintaining the annular gap 158 within close tolerances allows any drain fluid flowing through gap 158 to be precisely controlled, preferably minimized so that the process fluid delivered to a process is maximized (i.e., maximizing the process fluid that follows fluid pathway 167 and exits rotary union 20 at rotor fluid outlet 75). Also as discussed above, maintaining the annular gap 158 can prevent debris generation, which is highly desirable since the main fluid pathway 167 passes nearby across gap 160. In further detail, as shown, from gap 158, the process fluid(s) can drain into gap 156, which is between 1) the first surface 32 of the bottom 28 of housing 24 and 2) end portion 85 of rotor exterior 84 and second major surface 148 of second clamping element 146. From there, the drain fluid(s) can enter drain 35 in housing 24, where they can be carried away/handled via plumbing attached to drain 35 (not shown). Alternatively, rotary union could have more than one drain pathway.

Several non-limiting alternative embodiments are described below with reference to FIGS. 6 and 7.

Figure 6:
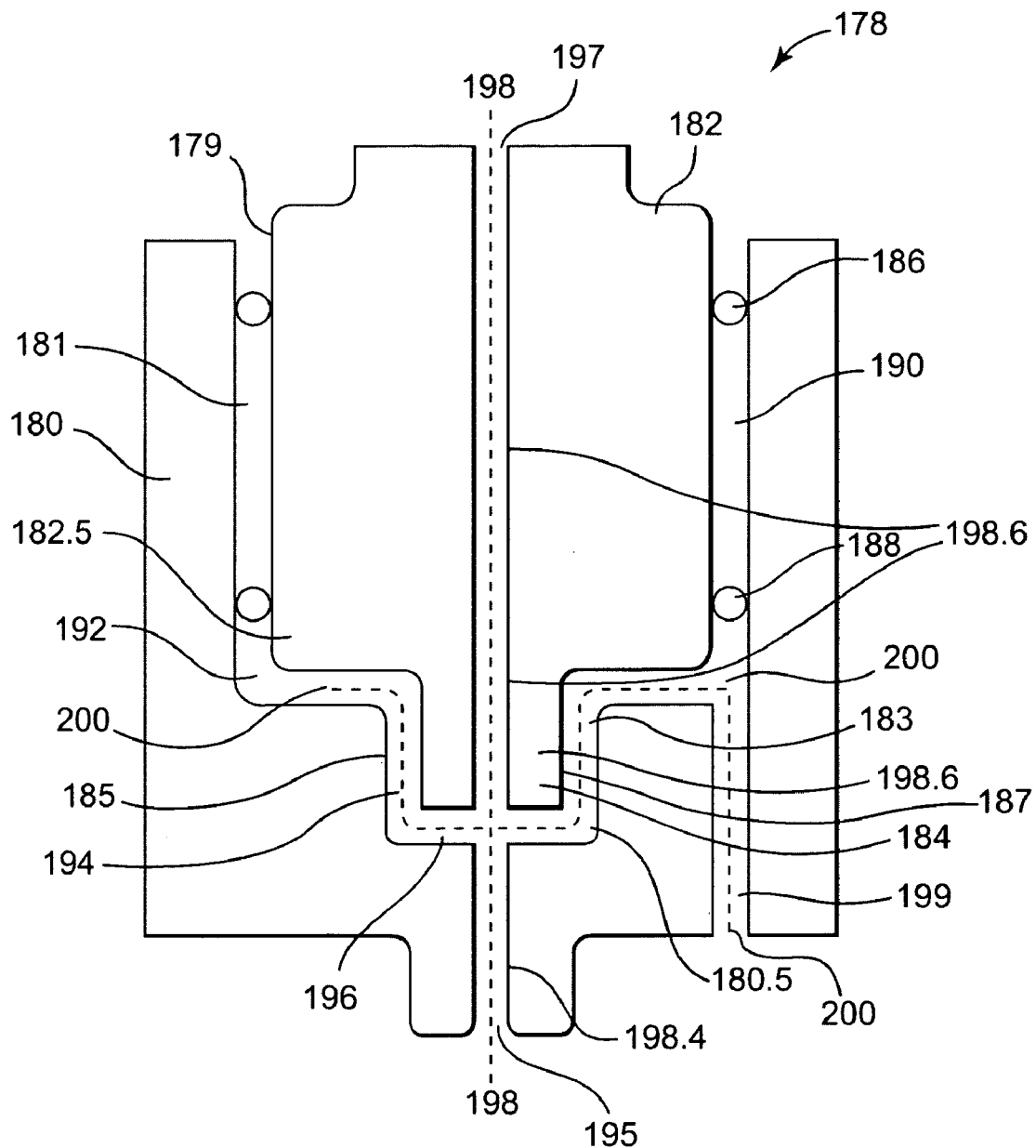
FIG. 6 illustrates a schematic, cross-sectional view of a first alternative rotary union according to the present invention.

FIG. 6 illustrates rotary union 178 that includes housing 180, post 184, rotor 182, first fluid port 195, second fluid port 197, fluid pathway 198, and drain pathway 200. Rotor 182 is rotatably coupled to housing 180, and has a first end 182.5 positioned at least partially in housing interior 181. Post 184 extends from first end 182.5 of rotor 182 at least partially into chamber 180.5 in housing 180, chamber 180.5 being oversized relative to post 184 such that an annular gap 194 (e.g., space between housing interior wall 185 and post exterior side region 187) extends along a length of post 184 between post 184 and housing 180 (in contrast to post 58 extending from housing bottom 28 at least partially into chamber 77 as shown in FIG. 1). As shown, housing 180 includes an opening 183 and an interior wall 185 such that the interior wall 185 extends from the opening 183 into the housing 180 and helps to define housing interior 181.

First fluid port 195 is associated with housing 180 through which a fluid can exit or enter rotary union 178. Second fluid port 197 is associated with rotor 182 through which a fluid can exit or enter rotary union 178.

Fluid pathway 198 extends through rotary union 178 at least between first fluid port 195 and second fluid port 197. Fluid pathway 198 includes first pathway portion 198.4 and second pathway portion 198.6 such that first pathway portion 198.4 extends through housing 180 and second pathway portion 198.6 extends through post 184, and such that first pathway portion 198.4 is in fluid communication with second pathway portion 198.6 via a juncture inside the housing chamber 180.5.

Drain pathway 200 has an inlet inside the housing chamber 180.5 proximal to the juncture where first pathway portion 198.4 is in fluid communication with second pathway portion 198.6. The annular gap 194 between post 184 and housing 180 constitutes at least a portion of drain pathway 200.

Process fluid(s) can be transferred among locations that rotate relative to one another by following fluid pathway 198. Because there is a tendency for process fluid(s) to leak into gap 194, rotary union 178 also includes drain pathway 200. Such leaking fluid(s) can drain through drain pathway 200 and from rotary union 178 via drain 199.

Preferably, rotor 182 is rotatably coupled to housing 180 by at least one bearing interposed between a portion of the rotor exterior 179 and a portion of the housing interior 181. As shown, rotor 182 is rotatably coupled to housing 180 preferably by interposing bearings 186 and 188 between a portion of the rotor exterior 179 and a portion of the housing interior 181.

An embodiment such as rotary union 178 can help reliably maintain annular spacing between certain components (e.g., the annular spacing 194 (similar to the annular spacing between rotor 70 and post 58 discussed above)) and/or can help reduce generation of debris and/or can help keep surfaces that slideably and/or rotatably engage each other outside of fluid pathways. For example, bearings 186 and 188 can help reliably maintain annular gap 194 within extremely close tolerances. This is highly desirable because maintaining annular gap 194 within close tolerances allows any drain fluid flowing through gap 194 to be precisely controlled, preferably minimized so that the process fluid delivered to a process is maximized. Alternatively, rotary union 178 may also contain one or more surface discontinuity (ies) (not shown) on one or more of the rotor 182, post 184, and housing 180 to help control the flow of fluid in drain pathway 200 that has leaked out of fluid pathway 198.

As shown, rotor 182 and post 184 are spaced apart from housing 180 by other gaps as well. Gap 190 helps define the space between the side of rotor 182 and housing 180. Gap 192 helps define the space between the bottom, as shown, of rotor 182 and housing 180. Gap 196 helps define the space between the bottom, as shown, of post 184 and housing 180.

Figure 7:
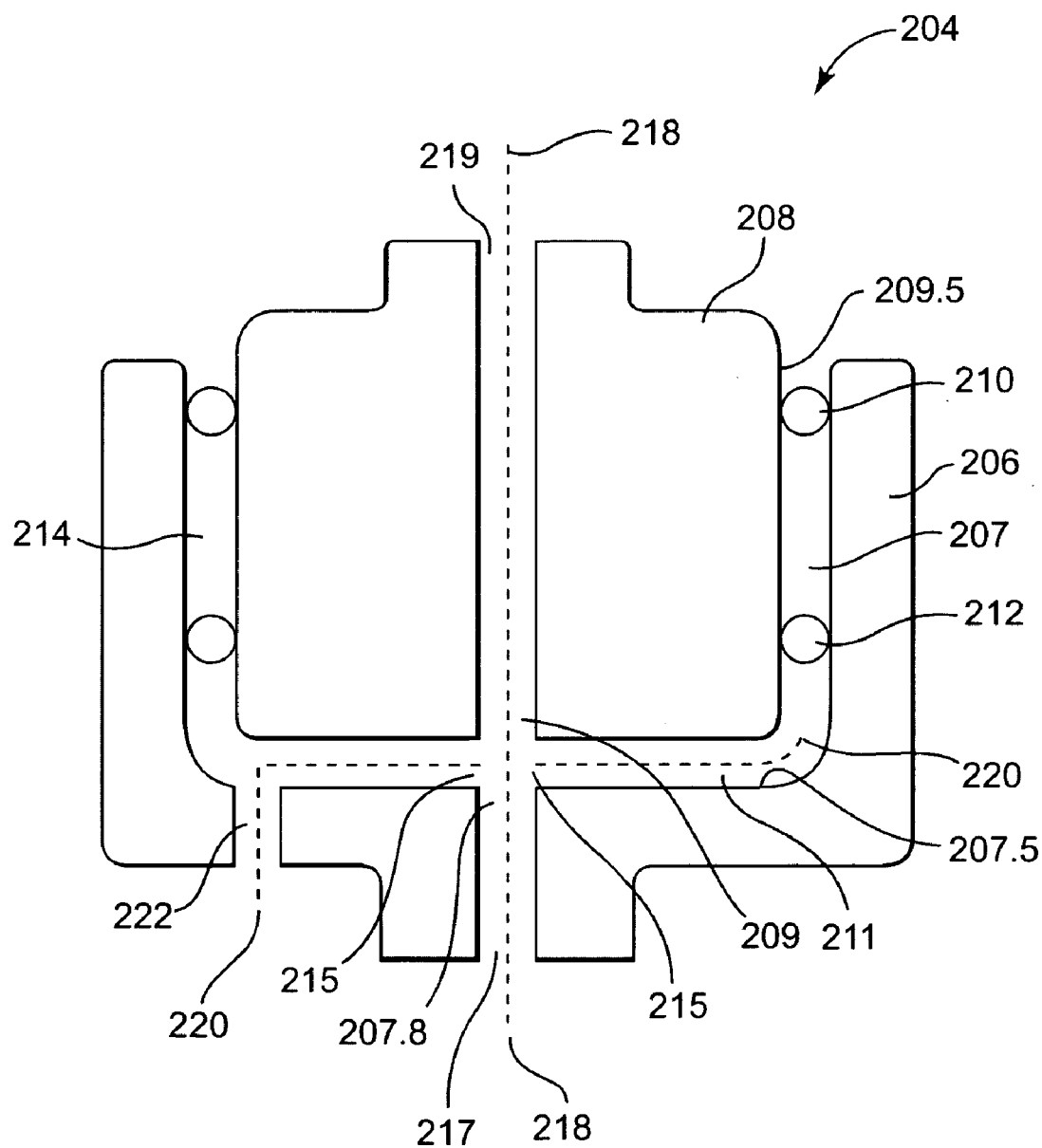
FIG. 7 illustrates a schematic, cross-sectional view of a second alternative rotary union according to the present invention.

FIG. 7 illustrates rotary union 204. Rotary union 204 includes a housing 206 and rotor 208. Housing 206 has a housing interior 207, a surface 207.5 located in the housing interior 207, and a fluid exit port 207.8 that exits out of the surface 207.5 located in the housing interior 207 and that is directed into the housing interior 207. Rotor 208 includes a fluid entry port 209 fluidly coupled to the housing fluid exit port 207.8, wherein the rotor 208 is rotatably coupled to the housing 206 by at least one bearing interposed between a portion of the rotor exterior 209.5 and a portion of the housing interior 207. Preferably, rotor 208 is rotatably coupled to housing 206 by first bearing 210 and second bearing 212 interposed between a portion of the rotor exterior 209.5 and a portion of the housing interior 207. Such an embodiment can help keep surfaces that slideably and/or rotatably engage each other outside of of fluid pathways. Rotary union 204 has an axial gap 211 between the surface 207.5 located in the housing interior 207 and the rotor exterior 209.5. Preferably, housing 206 and rotor 208 are made of the same dimensionally stable material. As shown, rotary union 204 also has a annular gap 214 between rotor exterior 209.5 and a portion of housing interior 207. Rotary union 204 also includes a rotary union fluid entry port 217, a rotary union fluid exit port 219, and a fluid pathway 218 extending from the rotary union fluid entry port 217 to the rotary union fluid exit port 219, wherein at least a portion of the fluid pathway 218 is inside the housing 206 and the rotor 208. Rotary union 204 also includes a drain pathway 220 having an inlet 215 inside the rotary union 204, wherein at least a portion of the drain pathway 220 is in at least a portion of the axial gap 211 between the surface 207.5 located in the housing interior 207 and the rotor exterior 209.5. Drain fluid can exit rotary union 204 via drain 222.

According to the present invention, the axial gap 211 between the housing interior 207 and the rotor exterior 209.5 can be maintained within extremely close tolerances. This is highly desirable because maintaining the axial gap 211 within close tolerances allows any drain fluid flowing through gap 211 to be precisely controlled, preferably minimized so that the process fluid delivered to a process is maximized. Maintaining the gap 211 also virtually prevents housing 206 and rotor 208 from slideably and/or rotatably engaging during relative rotation between housing 206 and rotor 208, which can reduce debris generation, preferably prevent debris generation, that may otherwise occur if housing 206 and rotor 208 were allowed to slideably and/or rotatably engage. Reducing and/or preventing generation of debris between housing 206 and rotor 208 is highly desirable since the main fluid pathway passes across at least a portion of axial gap 211.

The present invention includes methods of making and using rotary unions and/or fluid delivery systems according to the present invention.

Figure 8:
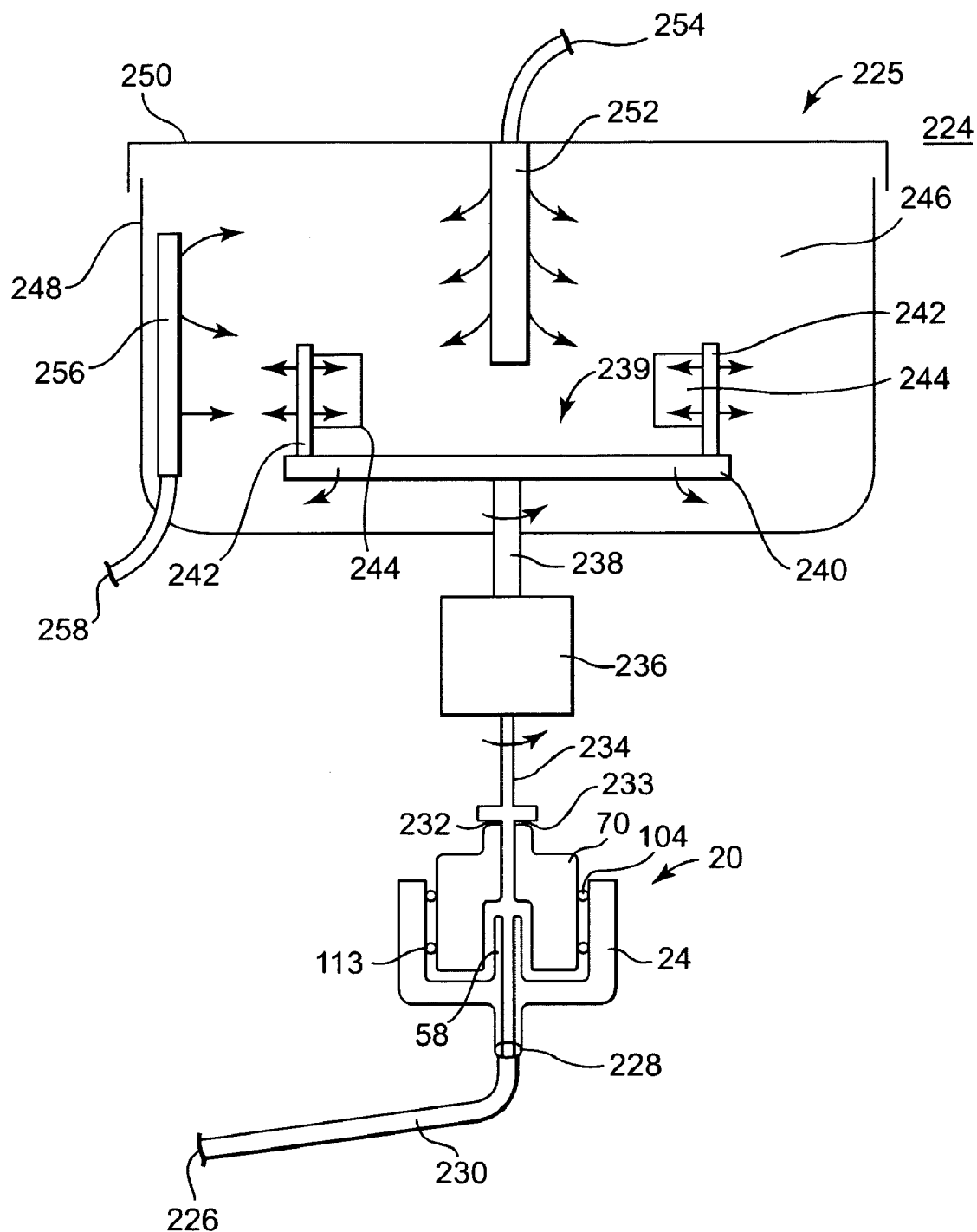
FIG. 8 illustrates a schematic of a spray processor system that incorporates the rotary union of FIG. 1.

FIG. 8 shows a representative manner by which principles of the present invention may be incorporated into the rinse and drying componentry of a wafer processing system 224 such as the MERCURY® or ZETA® spray processor systems available from FSI International, Inc., Chaska, Minn. Specifically, the rotary union componentry is modified so as to perform well over relatively wide temperature ranges and/or generate less debris from componentry. Except for such modification of the rotary union componentry as described above, system 224 in this illustrative mode of practice otherwise may be identical to the commercially available MERCURY® or ZETA® spray processor systems, and other conventional componentry of such systems is not shown for purposes of clarity.

In system 224, rotary union 20 can facilitate the transferring one or more process fluid(s) from first environment 226 (indicated by broken line) to second environment 239, where second environment 239 rotates relative to first environment 226. As shown, first environment 226, which is a source of one or more process fluid(s), is fluidly coupled to housing 24 of rotary union 20 via supply line 230 and coupling element 228 (any suitable fluid coupling elements are satisfactory). Alternatively, rotary union could be fluidly coupled to more than one supply line. Rotor 70, which rotates relative to housing 24 and first environment 226, is fluidly coupled to rotatable motor shaft 234 (indicated by arrow) by, as shown, a fastening clip 233 through slot 232 in rotor 70. Rotor 70 is fluidly coupled to second environment 239 via first motor shaft 234, motor 236, and second motor shaft 238. Second environment 239 includes turntable 240 with one or more turntable spray post(s)/wafer cassette support(s) 242. Turntable spray post(s)/wafer cassette support(s) 242 each can support a cassette of wafers 244 and include fluid exit ports (not shown) for dispensing one or more gases and liquids to treat the wafer(s). Second environment 239 is rotatably driven by motor 236 and can rotate relative to first environment 226. Second environment 239 is positioned in processing chamber 246 which is surrounded by spray tool housing 248 and covered by lid 250. As shown spray tool 225 also includes sidebowl spray post 256 and center spray post 252, each of which is can introduce one or more gases and/or liquids into processing chamber 246 from a source 258 (indicated by broken line) and a source 254 (indicated by broken line), respectively. Fluids dispensed in tool 225 can be used to treat wafers and/or rinse the processing chamber 246. A preferred embodiment of tool 225 can include rinsing and drying componentry that is modified so as to incorporate aspirating functionality to allow suck back of liquids, preferably during the course of a transition from a rinsing treatment to a drying treatment.

What is claimed is:

1. A rotary union, comprising:

a housing having a fluid path through which a fluid can be conveyed through the housing;

a rotor having a fluid path through which a fluid can be conveyed through the rotor, wherein the rotor is rotatably coupled to the housing;

at least a first and a second unlubricated bearings interposed between a portion of the rotor exterior and a portion of the housing interior, wherein the first and second bearings are spaced apart and rotatably couple the rotor and the housing;

a spacer member positioned between the first and second bearings, wherein an annular gap is between the spacer and the rotor, wherein the gap between the spacer and the rotor extends along the length of the spacer;

a post having a fluid path through which a fluid can be conveyed through the post, said post being positioned in the rotary union in a manner effective to help fluidly couple the rotor fluid path and the housing fluid path such that a fluid can be transferred between the housing and the rotor via the post fluid path; and an annular gap surrounding at least a portion of the post, wherein the annular gap constitutes at least a portion of a drain pathway through which a portion of fluid conveyed through the housing fluid path is drained from the rotary union.

2. The rotary union of claim 1, wherein at least one bearing comprises:
   ball bearings made with material comprising ceramic material; and
   inner and outer races made with material comprising hardened stainless steel.

3. A method of using the rotary union of claim 1 comprising, causing a process fluid to be conveyed from a source of process fluid, through the rotary union, and to a rotating point of use, wherein during the entire time period that the process fluid is being conveyed to the rotating point of use a portion of the process fluid conveyed into the rotary union is continuously drained from the rotary union through the drain pathway.

4. The method of claim 3, wherein the rotating point of use comprises a processing chamber in which a microelectronic device is positioned for treatment and further comprising the step of introducing the process fluid into the processing chamber in a manner such that the process fluid contacts the microelectronic device so as to treat the microelectronic device.

5. The method of claim 3, wherein the rotating point of use comprises a processing chamber in which a medical device is positioned for treatment and further comprising the step of introducing the process fluid into the processing chamber in a manner such that the process fluid contacts the medical device so as to treat the medical device.

6. The rotary union of claim 1, wherein the post exterior side region has one or more surface discontinuities.

7. A rotary union, comprising:
   a housing having a base portion;
   a rotor having a first end positioned at least partially in the housing interior, wherein the rotor is rotatably coupled to the housing;
   at least a first and a second unlubricated bearings interposed between a portion of the rotor exterior and a portion of the housing interior, wherein the first and second bearings are spaced apart and rotatably couple the rotor and the housing;
   a spacer member positioned between the first and second bearings to space the bearings apart, wherein an annular gap is between the spacer and the rotor, wherein the gap between the spacer and the rotor extends along the length of the spacer;
   a post that extends from the base portion of the housing at least partially into a chamber in the rotor, said chamber being oversized relative to the post such that an annular gap extends along a length of the post between the post and the rotor;
   a first fluid port associated with the housing through which a fluid can exit or enter the rotary union;
   a second fluid port associated with the rotor through which a fluid can exit or enter the rotary union;
   a fluid pathway extending through the rotary union at least between the first and second fluid ports, said fluid pathway comprising first and second pathway portions, wherein the first pathway portion extends through the post, the second pathway portion extends through the rotor, and wherein the first pathway portion is in fluid communication with the second pathway portion via a juncture inside the rotor chamber; and
   a drain pathway having an inlet inside the rotor chamber proximal to said juncture, wherein the annular gap between the post and the rotor constitutes at least a portion of the drain pathway.

8. The rotary union of claim 7, wherein at least one bearing comprises:
   ball bearings made with material comprising ceramic material; and
   inner and outer races made with material comprising hardened stainless steel.

9. The rotary union of claim 7, wherein the post exterior side region has one or more surface discontinuities.

10. A fluid delivery system comprising the rotary union of claim 7, comprising:
   a source of fluid, wherein the first fluid port is fluidly coupled to the source of fluid; and
   a rotating point of use, wherein the second fluid port is fluidly coupled to the rotating point of use.

11. A method of using the rotary union of claim 7, comprising:
   fluidly coupling the first fluid port to a source of process fluid;
   fluidly coupling the second fluid port to a rotational point of use; and
   transferring process fluid from the source of process fluid to the rotating point of use, wherein during the entire time period that the process fluid is being transferred to the rotating point of use a portion of the process fluid transferred into the rotary union is continuously drained from the rotary union through the drain pathway.

12. The rotary union of claim 9, wherein the one or more surface discontinuities comprise grooves.

13. A rotary union, comprising:
   a housing;
   a rotor having a first end positioned at least partially in the housing interior, wherein the rotor is rotatably coupled to the housing;
   at least a first and a second unlubricated bearings interposed between a portion of the rotor exterior and a portion of the housing interior, wherein the first and second bearings are spaced apart and rotatably couple the rotor and the housing;
   a spacer member positioned between the first and second bearings to space the bearings apart, wherein an annular gap is between the spacer and the rotor, wherein the gap between the spacer and the rotor extends along the length of the spacer;
   a post that extends from the first end of the rotor at least partially into a chamber in the housing, said chamber being oversized relative to the post such that an annular gap extends along a length of the post between the post and the housing, wherein the gap extends along the length of the post that is adjacent to the housing;
   a first fluid port associated with the housing through which a fluid can exit or enter the rotary union;
   a second fluid port associated with the rotor through which a fluid can exit or enter the rotary union;
   a fluid pathway extending through the rotary union at least between the first and second fluid ports, said fluid pathway comprising first and second pathway portions, wherein the first pathway portion extends through the housing, the second pathway portion extends through the post, and wherein the first pathway portion is in fluid communication with the second pathway portion via a juncture inside the housing chamber; and
   a drain pathway having an inlet inside the housing chamber proximal to said juncture, wherein the annular gap between the post and the housing constitutes at least a portion of the drain pathway.

14. The rotary union of claim 13, wherein at least one bearing comprises:
   ball bearings made with material comprising ceramic material; and inner and outer races made with material comprising hardened stainless steel.

15. The rotary union of claim 13, wherein the post exterior side region has one or more surface discontinuities.

16. A method of making a rotary union comprising:
providing:
   a housing having a fluid path through which a fluid can be conveyed through the housing;
   a rotor having a fluid path through which a fluid can be conveyed through the rotor;
   a post having a fluid path through which a fluid can be conveyed through the post;
   at least a first and a second unlubricated bearings; and
   a spacer;
positioning the post in the rotary union in a manner effective to help fluidly couple the rotor fluid path and the housing fluid path such that a fluid can be transferred between the housing and the rotor via the post fluid path;
rotatably coupling the rotor to the housing such that an annular gap surrounds at least a portion of the post, wherein rotatably coupling the rotor to the housing comprises;
   interposing the at least first and second unlubricated bearings between a portion of the rotor exterior and a portion of the housing interior in a manner such that the bearings are spaced apart, wherein the annular gap constitutes at least a portion of a drain pathway through which a portion of fluid conveyed into the rotary union is drained from the rotary union; and
   interposing the spacer member between the first and second bearings to space the bearings apart, wherein an annular gap is between the spacer and the rotor, wherein the gap between the spacer and the rotor extends along the length of the spacer.

17. The method of claim 16, wherein at least one bearing comprises:
   ball bearings made with material comprising ceramic material; and
   inner and outer races made with material comprising hardened stainless steel.

18. The method of claim 16, wherein the post exterior side region has one or more surface discontinuities.

19. A rotary union, comprising:
   a housing having a base portion;
   a rotor having a first end positioned at least partially in the housing interior, wherein the rotor is rotatably coupled to the housing;
   a post that extends from the base portion of the housing at least partially into a chamber in the rotor, said chamber being oversized relative to the post such that an annular gap is between the post and the rotor, wherein the gap extends along the length of the post that is adjacent to the rotor;
   a first and a second unlubricated bearings interposed between a portion of the rotor exterior and a portion of the housing interior, wherein the first and second bearings rotatably couple the rotor and the housing;
   a first fluid port associated with the housing through which a fluid can exit or enter the rotary union;
   a second fluid port associated with the rotor through which a fluid can exit or enter the rotary union;
   a fluid pathway extending through the rotary union at least between the first and second fluid ports, said fluid pathway comprising first and second pathway portions, wherein the first pathway portion extends through the post, the second pathway portion extends through the rotor, and wherein the first pathway portion is in fluid communication with the second pathway portion via a juncture inside the rotor chamber;
   a spacer member positioned between the first and second bearing to space the bearings apart such that the first bearing is approximately coplanar with one end of the post and the second bearing is approximately coplanar with the other end of the post, wherein an annular gap is between the spacer and the rotor, wherein the gap between the spacer and the rotor extends along the length of the spacer; and
   a drain pathway having an inlet inside the rotor chamber proximal to said juncture, wherein the annular gap between the post and the rotor constitutes at least a portion of the drain pathway.

20. The rotary union of claim 19, wherein the post exterior side region has one or more surface discontinuities.

* * * * *